(12) United States Patent
Boss et al.

(10) Patent No.: US 8,055,541 B2
(45) Date of Patent: Nov. 8, 2011

(54) OBJECT TRANSACTION METHOD AND SYSTEM

(75) Inventors: Gregory Jensen Boss, American Fork, UT (US); Rick Allen Hamilton, II, Charlottesville, VA (US); Richard Habersham Le Sesne, Chapel Hill, NC (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 11/747,251

(22) Filed: May 11, 2007

(65) Prior Publication Data

US 2008/0281670 A1    Nov. 13, 2008

(51) Int. Cl.
*G06Q 20/00* (2006.01)
*G06Q 30/00* (2006.01)

(52) U.S. Cl. ............................ 705/16; 705/17; 705/26.1

(58) Field of Classification Search ................. None
See application file for complete search history.

(56) References Cited

U.S. PATENT DOCUMENTS 6,766,947 B2   7/2004   Wan et al.
6,873,260 B2   3/2005   Lancos et al.
2004/0232224 A1   11/2004   Beenau et al.
2005/0253718 A1   11/2005   Droms et al.

FOREIGN PATENT DOCUMENTS

WO    WO2005081183    9/2005

OTHER PUBLICATIONS

Chen, et al.; Short-range Wireless Technologies with Mobile Payments Systems; ICEC'04, Sixth International conference on Electronic Commerce; pp. 649-656.

*Primary Examiner* — Faris Almatrahi
(74) *Attorney, Agent, or Firm* — Schmeiser, Olsen & Watts; William E. Schiesser (57) ABSTRACT

A transaction method and system. The system comprises a computing apparatus, a plurality of transceivers connected to the computing apparatus, and a plurality of transponder devices. Each transponder device comprising a customer data segment associated with a different customer from a plurality of customers for an entity. The computing apparatus receives from a first transponder device through a first transceiver, a first customer data segment. The first customer data segment is associated with a first customer of the plurality of customers. The first transponder device is possessed by the first customer. The first customer is located within a specified proximity of the first transceiver. The computing apparatus performs a first specified function for the first customer. The first specified function is based on the first customer data segment and a location of the first transceiver.

47 Claims, 8 Drawing Sheets

OBJECT TRANSACTION METHOD AND SYSTEM

FIELD OF INVENTION

The present invention relates to a method and associated system for performing transactions for people with respect to objects.

BACKGROUND OF THE INVENTION

Tracking a plurality of people and information associated with the people within a specified retail area typically requires a complicated process that is not efficient. Financial information associated with people wishing to make a purchase in a retail area is typically retrieved manually at specified locations. Manually retrieving the financial information associated with the people wishing to make a purchase is time consuming and requires a large workforce. Accordingly, there exists a need in the art to overcome at least some of the deficiencies and limitations described herein above.

SUMMARY OF THE INVENTION

The present invention provides a transaction method within a transaction system, said transaction system comprising a computing apparatus, a plurality of transceivers electrically connected to said computing apparatus, and a plurality of customer issued transponder devices, each customer issued transponder device of said plurality of customer issued transponder devices comprising a customer issued transponder and a customer issued memory device, each said customer issued memory device comprising a customer data segment from a plurality of customer data segments, each said customer data segment associated with a different customer from a plurality of customers for an entity, said method comprising:

receiving from a first customer issued transponder device of said customer issued transponder devices, by said computing apparatus through a first transceiver of said plurality of transceivers, a first customer data segment from said plurality of customer data segments, said first customer data segment associated with a first customer of said plurality of customers, wherein said first customer issued transponder device is possessed by said first customer, and wherein said first customer is located within a specified proximity of said first transceiver; and performing, by said computing apparatus, a first specified function for said first customer, said first specified function based on said first customer data segment and a location of said first transceiver.

The present invention provides a transaction system comprising a computing apparatus, a plurality of transceivers electrically connected to said computing apparatus, and a plurality of customer issued transponder devices, each customer issued transponder device of said plurality of customer issued transponder devices comprising a customer issued transponder and a customer issued memory device, each said customer issued memory device comprising a customer data segment from a plurality of customer data segments, each said customer data segment associated with a different customer from a plurality of customers for an entity, said computing apparatus comprising a processor coupled to a computer-readable memory unit, said memory unit comprising instructions that when executed by the processor implement a transaction method, said method comprising:

receiving from a first customer issued transponder device of said customer issued transponder devices, by said computing apparatus through a first transceiver of said plurality of transceivers, a first customer data segment from said plurality of customer data segments, said first customer data segment associated with a first customer of said plurality of customers, wherein said first customer issued transponder device is possessed by said first customer, and wherein said first customer is located within a specified proximity of said first transceiver; and performing, by said computing apparatus, a first specified function for said first customer, said first specified function based on said first customer data segment and a location of said first transceiver.

The present invention provides a computer program product, comprising a computer usable medium comprising computer readable program code embodied therein, said computer readable program code comprising an algorithm adapted to implement a transaction method within an transaction system comprising a computing apparatus, a plurality of transceivers electrically connected to said computing apparatus, and a plurality of customer issued transponder devices, each customer issued transponder device of said plurality of customer issued transponder devices comprising a customer issued transponder and a customer issued memory device, each said customer issued memory device comprising a customer data segment from a plurality of customer data segments, each said customer data segment associated with a different customer from a plurality of customers for an entity, said computing apparatus comprising a processor coupled to a computer-readable memory unit, said memory unit comprising instructions that when executed by the processor implement a transaction method, said method comprising:

receiving from a first customer issued transponder device of said customer issued transponder devices, by said computing apparatus through a first transceiver of said plurality of transceivers, a first customer data segment from said plurality of customer data segments, said first customer data segment associated with a first customer of said plurality of customers, wherein said first customer issued transponder device is possessed by said first customer, and wherein said first customer is located within a specified proximity of said first transceiver; and performing, by said computing apparatus, a first specified function for said first customer, said first specified function based on said first customer data segment and a location of said first transceiver.

The present invention provides a process for integrating computing infrastructure, comprising integrating computer-readable code into a transaction system comprising a computing apparatus, a plurality of transceivers electrically connected to said computing apparatus, and a plurality of customer issued transponder devices, each customer issued transponder device of said plurality of customer issued transponder devices comprising a customer issued transponder and a customer issued memory device, each said customer issued memory device comprising a customer data segment from a plurality of customer data segments, each said customer data segment associated with a different customer from a plurality of customers for an entity, said method comprising:

receiving from a first customer issued transponder device of said customer issued transponder devices, by said computing apparatus through a first transceiver of said plurality of transceivers, a first customer data segment from said plurality of customer data segments, said first customer data segment associated with a first customer of said plurality of customers, wherein said first customer issued transponder device is possessed by said first customer, and wherein said first customer is located within a specified proximity of said first transceiver; and performing, by said computing apparatus, a first specified function for said first customer, said first specified function based on said first customer data segment and a location of said first transceiver.

The present invention advantageously provides simple method and associated system capable of tracking a plurality of people within a specified area.

DETAILED DESCRIPTION OF THE INVENTION

Figure 1:
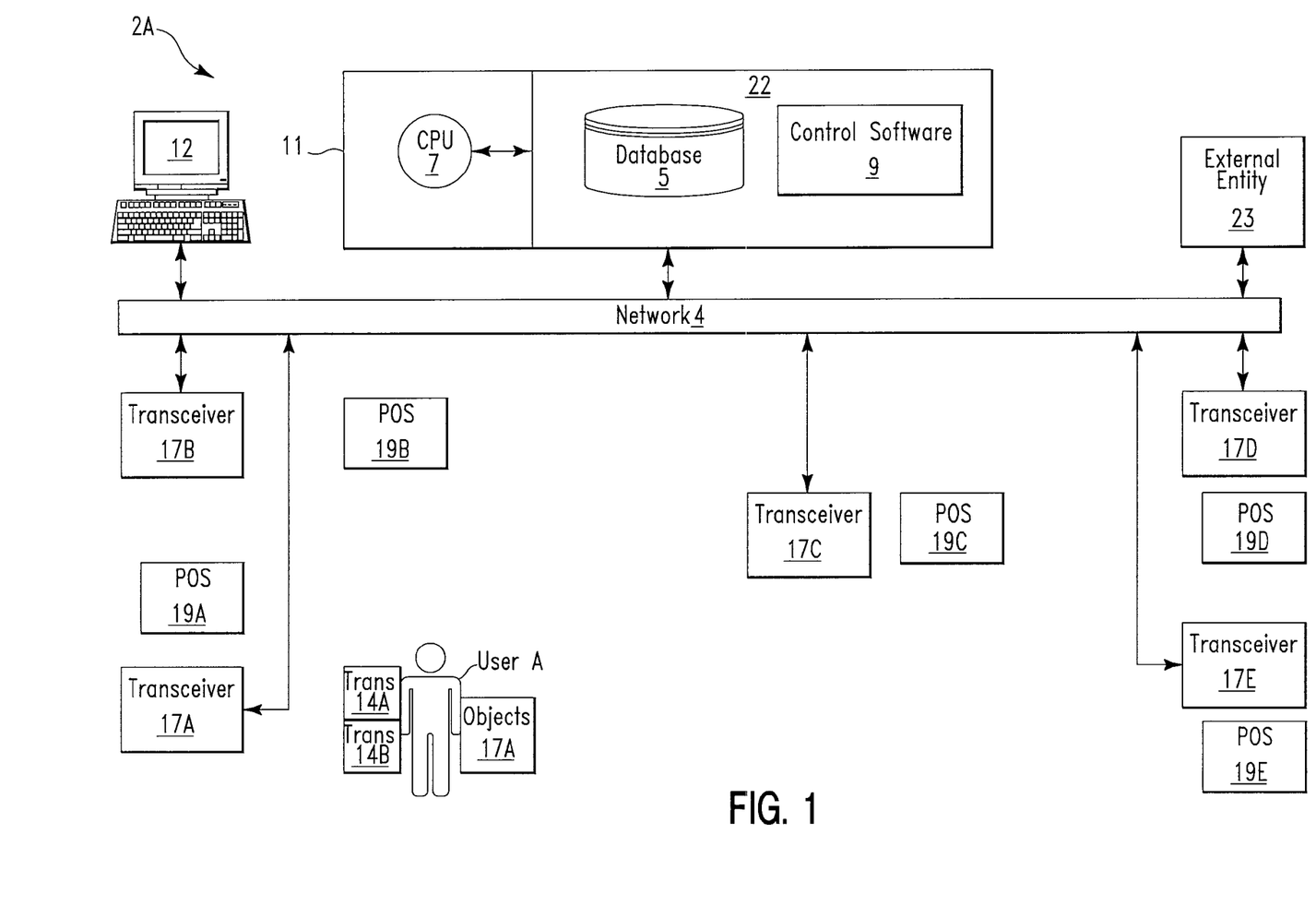
FIG. 1 illustrates a block diagram view of a system for identifying a user and performing transactions or functions for the user, in accordance with embodiments of the present invention.

FIG. 1 illustrates a block diagram view of a system 2A for identifying a user A and performing transactions or functions for user A, in accordance with embodiments of the present invention. System 2A in the description of FIG. 1 is located and implemented in a retail center (e.g., a grocery store, a department store, a discount warehouse, etc). User A in the description of FIG. 2A is a customer of the retail center. Note that system 2A may be implemented in any environment requiring transactions or functions to be performed for users. System 2A is used to:
1. Continuously monitor and detect users (e.g., Customers) shopping in a retail store before they reach a point of sale (POS) location (e.g., a cash register lane).
2. Retrieve customer data for each user.
3. Automatically perform specified functions with respect to objects 17A (e.g., retail products) for each user based on the user (e.g., customer) data. For example, specified user/customer functions may include, inter alia, user credit card authorization to purchase products, predict a product brand for purchase based on user history, a selection between multiple credit cards and/or debit cards to pay for products, prediction for selection of payment method for purchasing products, approval for user to purchase restricted products (e.g., prescription drugs, alcohol, cigarettes, weapons, etc), etc.
4. Automatically perform specified functions for user A with respect to objects not retrieved by user A.

System 2A comprises computing apparatus 11, an interface 4, transceivers 17A . . . 17E, transponder 14A and/or 14B, point of sale (POS) apparatuses 19A . . . 19E, and an input apparatus 12. Input apparatus 12 may be used to enter customer data into computing apparatus and/or transponder 14A. Computing apparatus 11 comprises a central processing unit (CPU) 7 and a memory structure 22. Memory structure comprises control software 9 and a database 5. Control software 9 controls all user data flow between transceivers 17A . . . 17E and computing apparatus 11. Control software 9, additionally controls user data flow between computing apparatus 11 and an external user entity 23. External user entity may comprise, inter alia, a bank, a credit card company, a medical records database, etc. Database 5 stores user data inputted through input device 12 or any user data retrieved from transponder 14A. User data may comprise credit card or bank information for the user, an age of the user, prescriptions/medical information for the user, permit information (e.g., weapon permit, etc) for the user, etc. Interface 4 electrically connects transceivers 17A . . . 17E to computing apparatus 11. Interface 4 may comprise any type of interface including, inter alia, a local area network (LAN), a wide area network (WAN), the Internet, etc. Transceivers 17A . . . 17E may comprise any type of transceiver (i.e., with a memory unit) including, inter alia, a radio frequency identification (RFID) tag reader, a wireless fidelity (Wi-Fi) transceiver, a Bluetooth transceiver, etc. Transponder 14A may comprise any type of transponder including, inter alia, an RFID tag, a wireless fidelity (Wi-Fi) transponder, a Bluetooth transponder, etc. The RFID tag reader and RFID tag may comprise each use version 2 (V2) technologies.

Transceivers 17A . . . 17D (i.e., located in a retail center) are placed in a grid or mesh network style (e.g., a Cartesian grid) arrangement such that each of transceivers 17A . . . 17E is placed in a specified location that is within a specified proximity to one of POS apparatuses 19A . . . 19E or path in which user A (i.e., a customer) will pass through before reaching a POS location within the retail center. Transceivers 17A . . . 17E are placed at strategic distances from POS locations so that transponder 14A may be scanned and identified within a restricted local area. Transceivers 17A . . . 17E may be placed about from 5-10 feet from each other. Transceivers 17A . . . 17E continuously monitor, record, and report that user A is entering and leaving a zone of the grid. Each of transceivers 17A . . . 17E is connected to computing apparatus 11 and therefore connected to control software 9. Control software 9 collects and correlates user related data (e.g., user name, user tendencies, user payment information, etc) retrieved from transponders 14 and 14B through transceivers 17A . . . 17E. Correlated user data from each of transceivers 17A . . . 17E reveals movement and locations of user A (e.g., customers). The user data is used to control and activate communications systems at POS locations. When user A meets certain specified criteria, an instruction is sent from the control software 9 to one of POS apparatuses 19A . . . 19E to open a line of communication and perform a specified function. Examples of specified criteria are described as follows:
1. A minimum distance that user A is from one of POS apparatuses 19A . . . 19E.
2. A maximum distance that user A is from one of POS apparatuses 19A . . . 19E.
3. An angle of trajectory that user A is with respect to one of POS apparatuses 19A . . . 19E. This information may be used to predict projected path of for user A and a distance of a closest point on the projected path to one of POS apparatuses 19A . . . 19E.

4. A speed of user A along the projected path. This information is generated by measuring a time that user A moves from one of POS apparatuses 19A . . . 19E to another.

In order to implement system 2A, user data (e.g., bank information, permit information, age, name, etc) must be entered (e.g., through input apparatus 12) and stored on transponder 14A. User information may comprise, inter alia:
1. User name
2. Credit card or bank information for the user
3. User age
4. Prescriptions/medical information for the user
5. Permit information (e.g., weapon permit, etc) for the user.
6. Past user history (e.g., specific brands purchased in the past, specified payment means used to purchase products in the past, etc).

When user A enters the retail center he/she will go to a data entry area (e.g., a service desk) where user (i.e., for user A) information is retrieved. User data for user A is stored on is stored on transponder 14A. Additionally, user data may be stored in database 5. The user data may be entered into database 5 using input apparatus 12. Additionally, if user A is a repeat customer for the retail center, past user history data may be stored on transponder 14A and/or database 5. For example, if user A is a repeat customer, past user history data such as, inter alia, past payment means data (e.g., specific credit card used for purchases in the past) may be stored on transponder 14A. The past user history data is used to predict user A tendencies (e.g., credit card to be used for a purchase) before User A reaches a POS location to purchase objects 17A (e.g., products such as groceries, etc). The aforementioned process would enable the retail center to obtain prior approval for user A to use the predicted credit card before reaching the POS location thereby reducing a wait time when purchasing objects 17A should user A choose to use the predicted credit card to purchase objects 17A.

After the user data is stored on transponder 14A. Transponder 14A is assigned to user A. Transponder 14A may be comprised by a user ID card, etc. For example, if transponder A is an RFID tag, a security badge comprising the RFID tag may be issued to user A.

Additionally, a transponder 14B may be retrieved by user A. Transponder 14B comprises information related to an object that is not directly accessible to user A.

When user A moves within range of one of transceivers 17A . . . 17E, the in range transceiver (e.g., transceiver 17A in FIG. 1) automatically detects transponder 14A and/or 14B possessed by user A. The transceiver retrieves any user data stored on transponder 14A and/or information related to an object that is not directly accessible to user A and transmits the data to computing apparatus 11. At this point, many different scenarios may occur.

As a first example, the user data for user A comprises past payment means data (i.e., past user payment history data) specifying a specific credit card used for purchases in the past. Computing apparatus 11 uses the past payment means data to predict a specific credit card that user A will use for purchasing objects 17A (e.g., products such as groceries, etc). Computing apparatus 11 automatically connects to external entity 23 (in this case external entity 23 is a credit card company for the specific credit card that user A is predicted to use) to obtain approval for user A to use the specified credit card for a purchase. Therefore, the retail center is able to obtain prior approval for user A to use the predicted credit card before reaching a POS apparatus (e.g., POS apparatus 19A . . . 19E), thereby reducing a wait time when purchasing objects 17A if user A chooses to use the predicted credit card to purchase objects 17A.

As a second example, the user data for user A comprises regulatory related data (e.g., age of user A, gun permit information, prescriptions, etc). Computing apparatus 11 uses the regulatory related data to approve user A to purchase regulatory controlled items such as, inter alia, alcohol, guns, cigarettes, prescription drugs, etc in case any of objects 17A comprise regulatory items. Therefore, when user A goes to a POS apparatus (i.e., one of POS apparatuses 19A . . . 19E) to cash out, a cashier does not have to ask user A to show an ID (e.g., a drivers license to prove age, a gun permit, a prescription, etc) to purchase any regulatory items.

As a third example, transponder 14B comprises information related to an object that is not directly accessible to user A. In this scenario, user A may retrieve a description card (i.e., comprising transponder 14B) for a specified object stored in a stock room for the retail center (e.g., a swing set, an appliance, etc). As the user A moves within range of one of transceivers 17A . . . 17E, the in range transceiver (e.g., transceiver 17A in FIG. 1) automatically detects transponder 14B possessed by user A and automatically notifies an attendant in the stock room that user A will retrieve the specified object stored in a stock room thereby enabling user A to go to the stock room and have the specified object retrieved and ready for pickup.

An example of implementation for system 2A is described as follows:

This example illustrates a grocery store that sells alcohol. A customer enters the grocery store and customer data comprising an age for the customer (i.e., customer age is sufficient to purchase alcohol) is inputted into an RFID tag comprised by a customer ID. The customer ID is issued to the customer and the customer proceeds throughout the store to purchase items. As the customer passes any of transceivers 17A . . . 17D, he/she is automatically authorized to purchase alcohol. The customer retrieves a bottle of liquor, places it in a cart, and proceeds to a POS apparatus (i.e., one of POS apparatuses 19A . . . 19E). When the cashier at the POS apparatus scans the bottle of liquor, he/she does not have to ask the customer for an ID to prove an adequate age as computing apparatus 11 has already pre-approved the customer to purchase the bottle of liquor.

Figure 2:
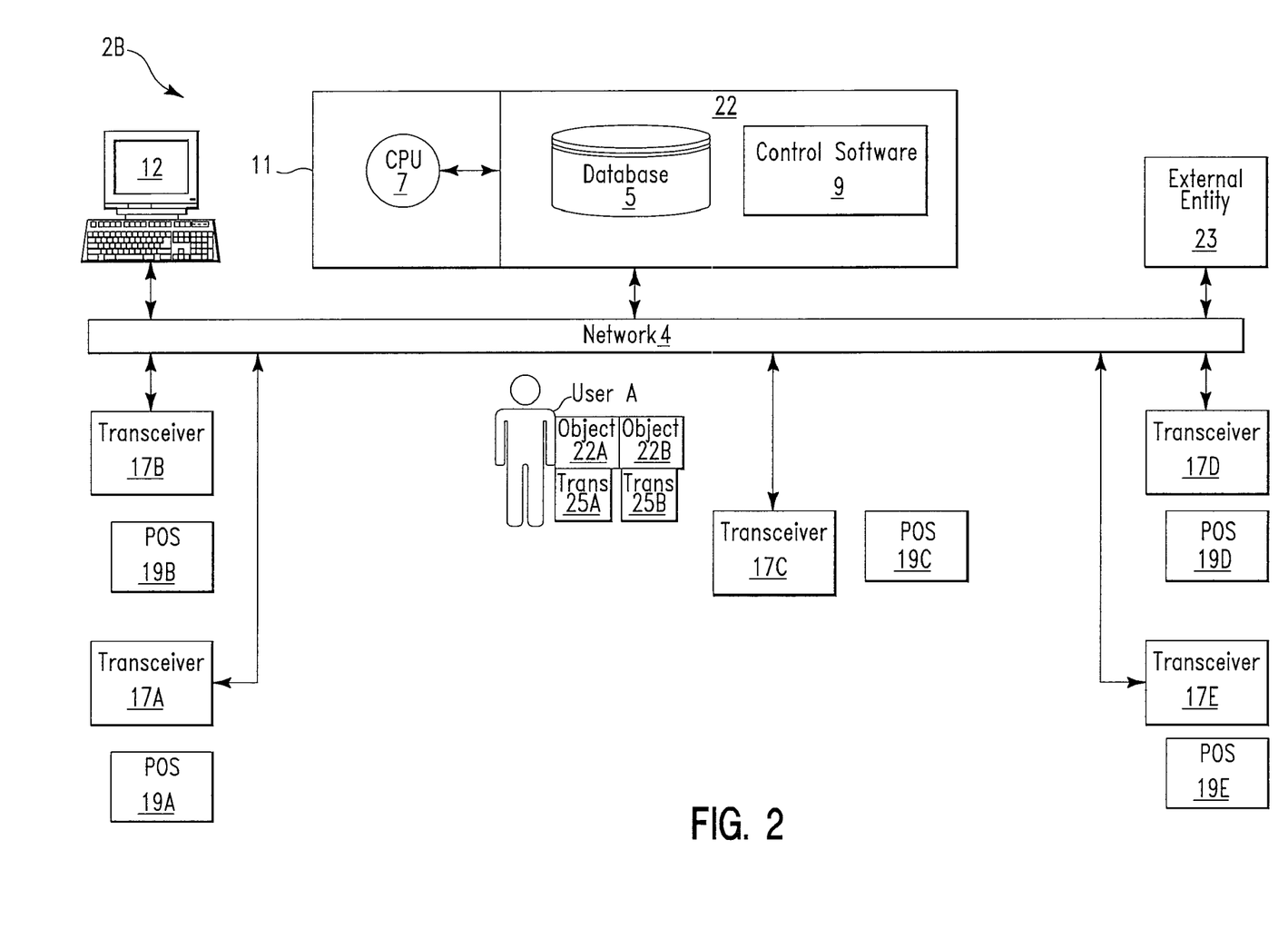
FIG. 2 illustrates a block diagram of an alternative system to the system of FIG. 1, in accordance with embodiments of the present invention.

FIG. 2 illustrates a block diagram of an alternative system 2B to the system 2A of FIG. 1, in accordance with embodiments of the present invention. In contrast to system 2A in FIG. 1, system 2B in FIG. 2 comprises transceivers 25A and 25B located on objects 22A and 22B. In FIG. 2, user A does not posses a transceiver. Transponders 25A and 25 B may comprise any type of transponder including, inter alia, an RFID tag, a wireless fidelity (Wi-Fi) transponder, a Bluetooth transponder, etc.

System 2B is used for performing transactions or functions for user A with respect to objects 22A and 22B. System 2A in the description of FIG. 2 is located and implemented in a retail center (e.g., a grocery store, a department store, a discount warehouse, etc). User A in the description of FIG. 2B is a customer of the retail center. Note that system 2B may be implemented in any environment requiring transactions or functions to be performed for users with respect to objects. System 2B is used to:
1. Continuously monitor and detect objects (e.g., retail items) in a retail store before they reach a point of sale (POS) location (e.g., a cash register lane).
2. Retrieve object data for each object.
3. Automatically perform specified functions with respect to objects 22A and 22B (e.g., retail products) based on the object (e.g., retail item) data. For example, specified functions may include, inter alia, monitoring (e.g., for theft purposes)

objects 22A and 22B as user A moves about the retail center, periodically scan for objects 22A and 22B and retrieve pricing information for objects 22A and 22B so that when user A reaches one of POS apparatuses, a price total for objects 22A and 22B has been calculated and a cashier does not have to scan packages 22A and 22B.

In order to implement system 2B, object data (e.g., pricing information, object identification information, etc) must be entered (e.g., through input apparatus 12) and stored on transponders 25A and 25B.

When objects 22A and 22B are received by the retail center (e.g., through a loading dock), object data for objects 22A and 22B is retrieved. Object data for object 22A is stored on is stored on transponder 25A. Object data for object 22B is stored on is stored on transponder 25B. Additionally, object data may be stored in database 5. The object data may be entered into database 5 using input apparatus 12.

After the object data is stored on transponders 25A and 25B transponder 25A is assigned and attached to object 22A and transponder 25B is assigned and attached to object 22B.

When user A retrieves object 22A and 22B (e.g., to purchase) and moves within range of one of transceivers 17A . . . 17E, the in range transceiver (e.g., transceiver 17C in FIG. 2) automatically detects transponder 25A possessed by object 22A and transponder 25B possessed by object 22B. The transceiver retrieves any object data stored on transponders 25A and 25B and transmits the object data to computing apparatus 11. At this point, there are many different uses for system 2B.

As a first example, transceivers 17A . . . 17E continuously monitors the retail center (i.e., for objects 22A and 22B) so that if user A tries to leave the retail center without paying for objects 22A and 22B, a warning signal may be transmitted to computing apparatus 11 and computing apparatus 11 may send a warning signal to security officers.

As a second example, transceivers 17A . . . 17E continuously monitors the retail center (i.e., for objects 22A and 22B) and calculates a price total for objects 22A and 22B so that when user A proceeds to check out (i.e., at one of POS apparatuses 19A . . . 19E), a total price for objects 22A and 22B may be given to user 22A without the cashier having to scan objects 22A and 22B.

Figure 3:
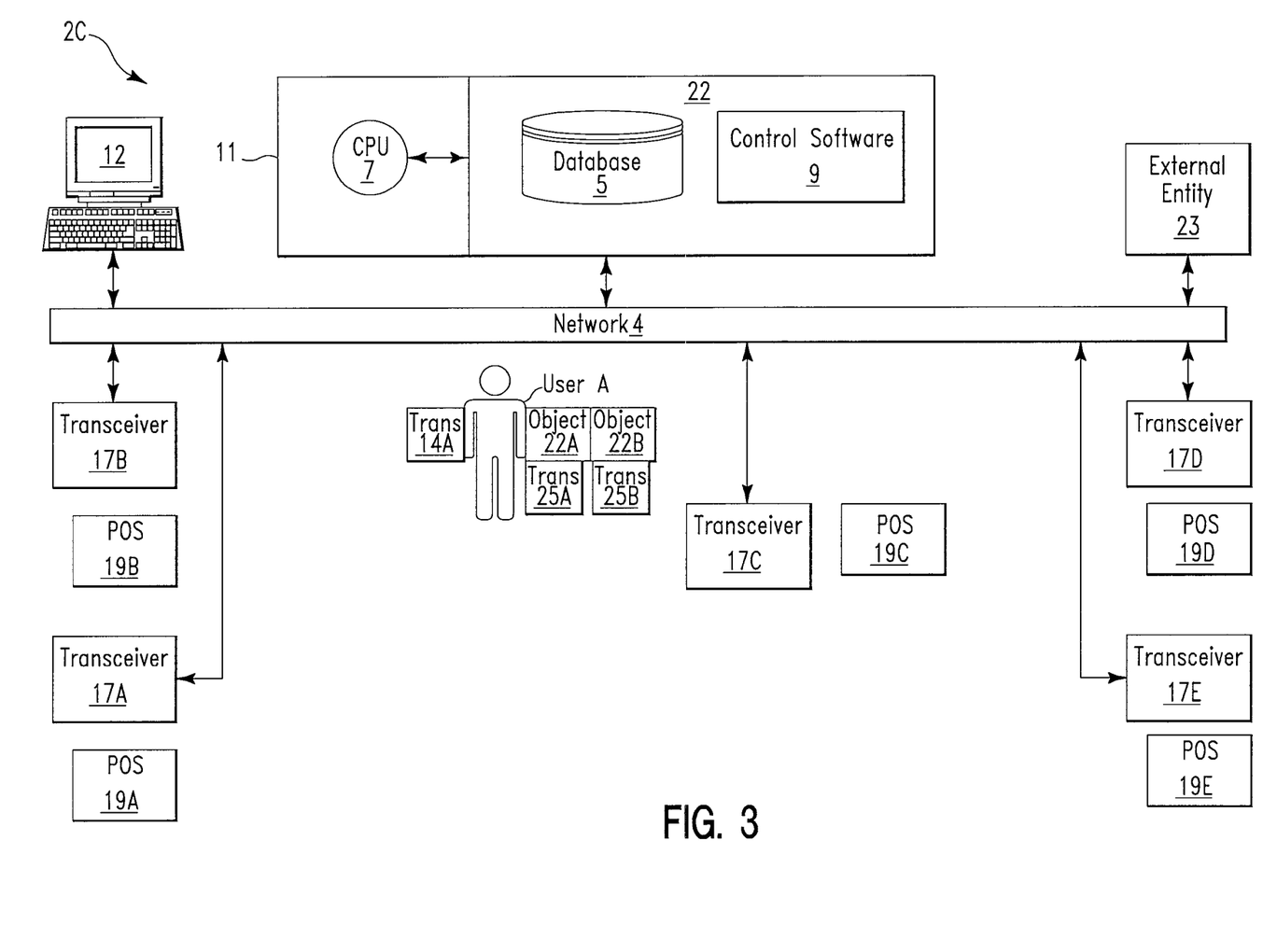
FIG. 3 illustrates a block diagram of a combination system, in accordance with embodiments of the present invention.

FIG. 3 illustrates a block diagram of a combination system 2C, in accordance with embodiments of the present invention. System 2C in FIG. 3 is a combination of systems 2A and 2B. In system 2C, user A possesses transceiver 14A and objects 22A and 22B possess transceivers 25A and 25B respectively.

An example of implementation for system 2C is described as follows:

This example illustrates a visit by user A (i.e., a customer) to a grocery store to purchase groceries (i.e., objects 22A and 22B). User A enters the grocery store and customer data comprising a preferred payment means (e.g., a preferred credit card) is inputted into an RFID tag (i.e., transceiver 14A) comprised by a customer ID. The customer ID is issued to user A and user A customer proceeds throughout the grocery store to purchase items. User A retrieves objects 22A and 22B (i.e., grocery items) comprising transceivers 25A and 25B and when user A passes any of transceivers 17A . . . 17D, user data and object data is retrieved and transmitted to computing apparatus 11. Computing apparatus 11 calculates a total price for objects 22A and 22B. Next, computing apparatus 11 uses the customer data comprising the preferred payment means (e.g., a preferred credit card) to automatically connect to external entity 23 (in this case external entity 23 is a credit card company for the preferred credit card for user A) to obtain approval for user A to use the specified credit card to purchase objects 22A and 22B. Therefore, the retail center is able to obtain a price for objects 22A and 22B and prior approval for user A to use the preferred credit card before reaching a POS apparatus (e.g., POS apparatus 19A . . . 19E), thereby reducing a wait time when purchasing objects 22A and 22B.

Figure 4:
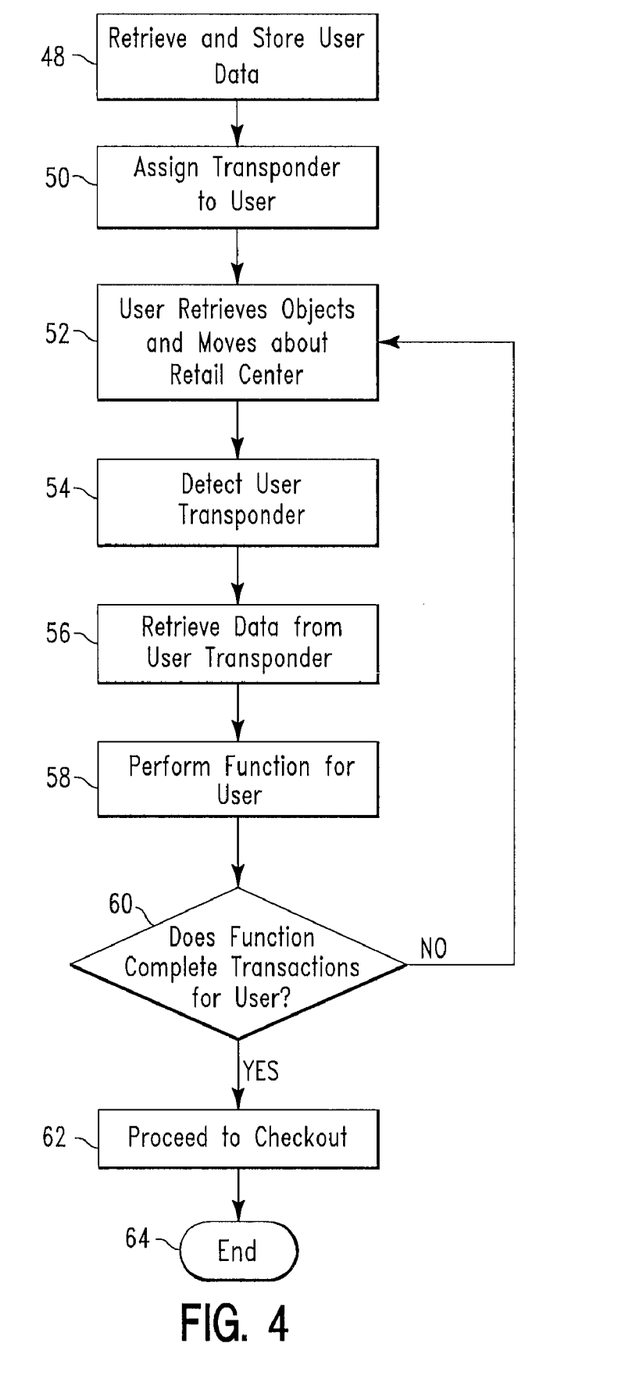
FIG. 4 is a flowchart illustrating an algorithm detailing a first overall process used by the system of FIG. 1, in accordance with embodiments of the present invention.

FIG. 4 is a flowchart illustrating an algorithm detailing a first overall process used by system 2A of FIG. 1, in accordance with embodiments of the present invention. In step 48, user data is retrieved from the user A and stored within transponder 14A. In step 50, transponder 14A is assigned to user A. In step 52, user A retrieves objects (e.g., objects 17A) and moves about a retail center. In step 54, transponder 14A is detected by one of transceivers 17A . . . 17E. In step 56, user data is retrieved form transponder 14A. In step 58, computing apparatus 11 performs a function for user A. For example, computing apparatus may predict a payment means for user A. In step 60, computing apparatus determines if the function performed in step 58 completes all transactions for the user A. If in step 60, computing apparatus determines that the function performed in step 58 does not complete all transactions for the user A then step 52 is repeated. If in step 60, computing apparatus determines that the function performed in step 58 does complete all transactions for the user A then in step 62 user A proceeds to checkout (i.e., one of POS apparatuses 19A . . . 19E) and the process ends in step 64.

Figure 5:
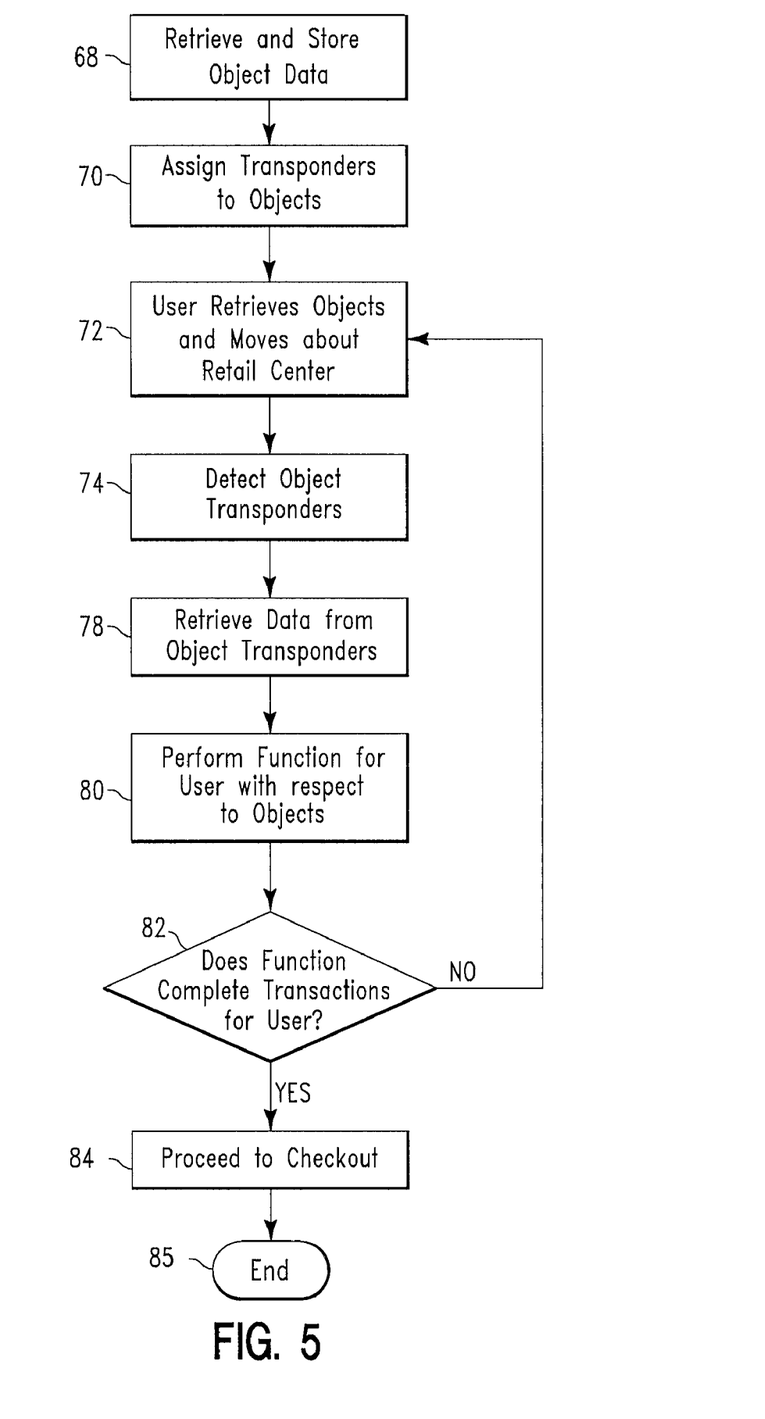
FIG. 5 is a flowchart illustrating an algorithm detailing an overall process used by the system of FIG. 2, in accordance with embodiments of the present invention.

FIG. 5 is a flowchart illustrating an algorithm detailing an overall process used by system 2B of FIG. 2, in accordance with embodiments of the present invention. In step 68, object data is retrieved for objects 22A and 22B and stored within transponders 25A and 25B. In step 70, transponders 25A and 25B are assigned and attached to objects 22A and 22B. In step 72, user A retrieves objects (e.g., objects 22A and 22B) and moves about the retail center. In step 74, transponders (e.g., transponders 25A and 25B) are detected by one of transceivers 17A . . . 17E. In step 78, object data is retrieved from transponders (e.g., transponders 25A and 25B). In step 80, computing apparatus 11 performs a function for user A with respect to objects 22A and 22B. For example, computing apparatus may retrieve pricing information for objects 22A and 22B. In step 82, computing apparatus 11 determines if the function performed in step 80 completes all transactions for the user A. If in step 82, computing apparatus 11 determines that the function performed in step 80 does not complete all transactions for the user A then step 72 is repeated. If in step 82, computing apparatus determines that the function performed in step 80 does complete all transactions for the user A then in step 84 user A proceeds to checkout (i.e., one of POS apparatuses 19A . . . 19E) and the process ends in step 85.

Figure 6:
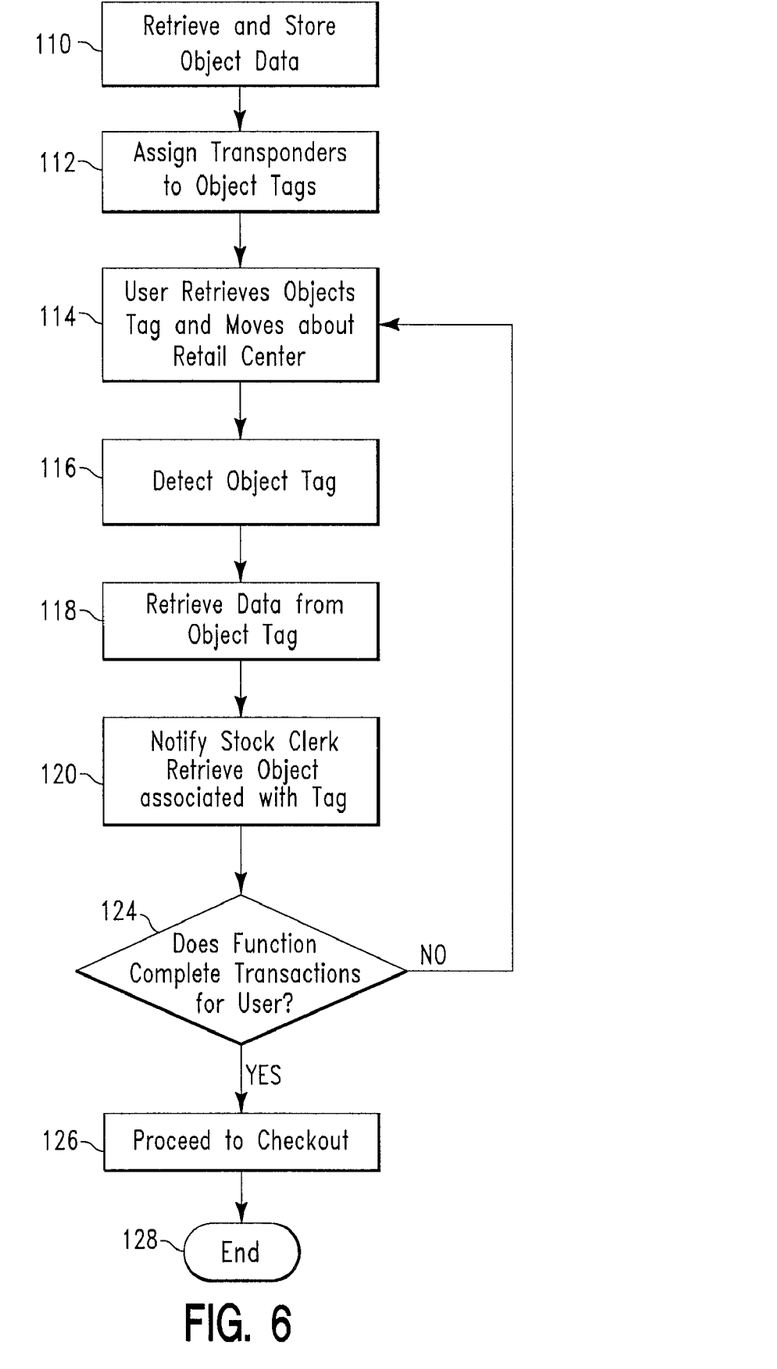
FIG. 6 is a flowchart illustrating an algorithm detailing a second overall process used by the system of FIG. 1, in accordance with embodiments of the present invention.

FIG. 6 is a flowchart illustrating an algorithm detailing a second overall process used by system 2A of FIG. 1, in accordance with embodiments of the present invention. In step 110, object data is retrieved for an object that is not directly accessible to user A is stored within transponder 14B. In step 112, transponder 14B is assigned to the object. In step 114, user A retrieves a tag for the object and moves about the retail center. In step 116, transponder 14B is detected by one of transceivers 17A . . . 17E. In step 118, object data is retrieved from transponder 14B. In step 120, computing apparatus 11 notifies a stock room clerk to retrieve the object associated with transponder 14B. In step 124, computing apparatus 11 determines if the function performed in step 120 completes all transactions for the user A. If in step 124, computing apparatus 11 determines that the function performed in step 120 does not complete all transactions for the user A then step 114 is repeated. If in step 124, computing apparatus determines that the function performed in step 120 does complete all transactions for the user A then in step 126 user A proceeds to checkout (i.e., one of POS apparatuses 19A . . . 19E) and the process ends in step 128.

Figure 7:
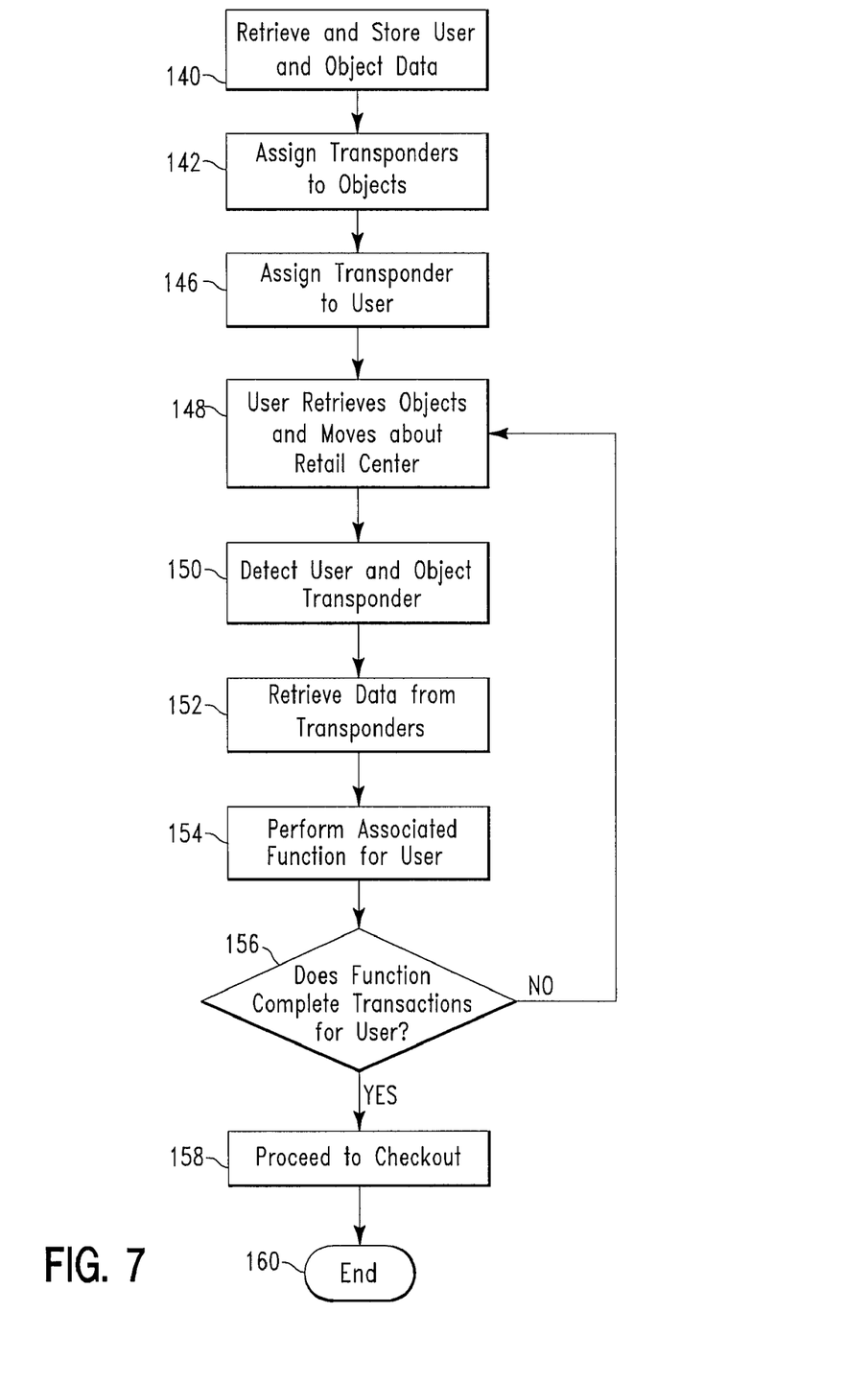
FIG. 7 is a flowchart illustrating an algorithm detailing an overall process used by the system of FIG. 3, in accordance with embodiments of the present invention.

FIG. 7 is a flowchart illustrating an algorithm detailing an overall process used by system 2C of FIG. 3, in accordance with embodiments of the present invention. In step 140, object data is retrieved for objects 22A and 22B and stored within transponders 25A and 25B. Additionally, user data is retrieved from the user A and stored within transponder 14A. In step 142, transponders 25A and 25B are assigned and attached to objects 22A and 22B. In step 146, transponder 14A is assigned to user A. In step 148, user A retrieves objects 22A and 22B and moves about a retail center. In step 150, transponders 14A, 25A, and 25B are detected by one of transceivers 17A . . . 17E. In step 152, user data is retrieved from transponder 14A and object data is retrieved from transponders 25A and 25B. In step 154, computing apparatus 11 performs a function for user A with respect to objects 22A and 22B. For example, computing apparatus may predict a payment means for user A, calculate a total price for objects 22A and 22B, and pre-approve (i.e., for predicted payment means) user A for total price. In step 156, computing apparatus determines if the function performed in step 154 completes all transactions for the user A. If in step 156, computing apparatus determines that the function performed in step 154 does not complete all transactions for the user A then step 148 is repeated. If in step 156, computing apparatus 11 determines that the function performed in step 154 does complete all transactions for the user A then in step 158 user A proceeds to checkout (i.e., one of POS apparatuses 19A . . . 19E) and the process ends in step 160.

Figure 8:
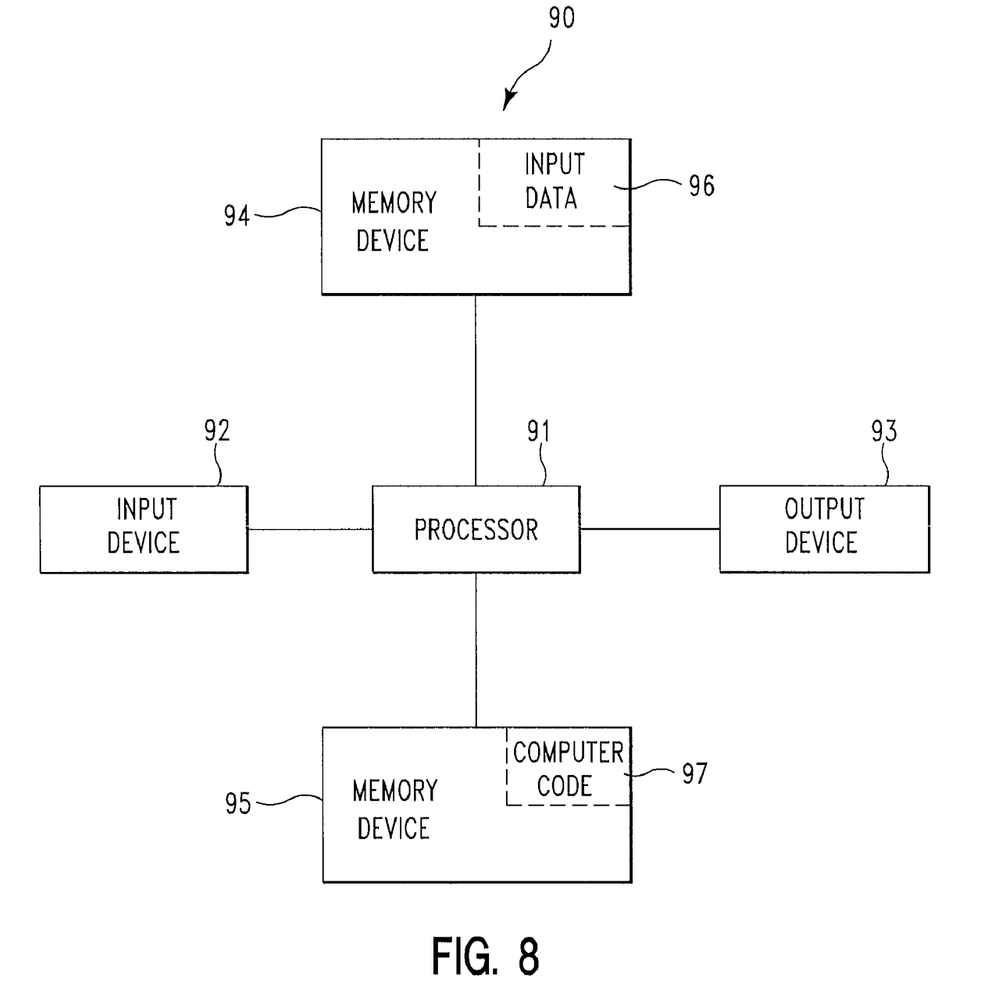
FIG. 8 illustrates a computer system used for implementing computing apparatus of FIGS. 1-3, in accordance with embodiments of the present invention.

FIG. 8 illustrates a computer system 90 used for implementing computing apparatus 11 of FIGS. 1-3, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for implementing the processes of FIGS. 4-7. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may comprise the algorithms of FIGS. 4-7 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to identify a user and perform transactions or functions for the user. Thus the present invention discloses a process for deploying or integrating computing infrastructure, comprising integrating computer-readable code into the computer system 90, wherein the code in combination with the computer system 90 is capable of performing a method for identifying a user and performing transactions functions for the user. In another embodiment, the invention provides a business method that performs the process steps of the invention on a subscription, advertising, and/or fee basis. That is, a service provider, such as a Solution Integrator, could offer to recover emails that have been made unavailable. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A transaction method within a transaction system, said method comprising:

receiving from a first customer issued transponder device of customer issued transponder devices, by a computing apparatus through a first transceiver of a plurality of transceivers, a first customer data segment from a plurality of customer data segments, said transaction system comprising a computing apparatus, said plurality of transceivers electrically connected to said computing apparatus, a plurality of object issued transponder devices, and a plurality of customer issued transponder devices, each customer issued transponder device of said plurality of customer issued transponder devices comprising a customer issued transponder and a customer issued memory device, each said customer issued memory device comprising a customer data segment from said plurality of customer data segments, each said customer data segment associated with a different customer from a plurality of customers for an entity, each said customer data segment comprising a preferred credit card payment means for an associated customer of said plurality of customers, each object issued transponder device of said plurality of object issued transponder devices comprising an object issued transponder and an object issued memory device, each said object issued memory device comprising an object data segment from a plurality of object data segments, each said object data segment associated with and located on a different object from a plurality of objects for sale by said entity, each said object data segment comprising pricing information and a description for an associated object of said plurality of objects, said first customer data segment associated with a first customer of said plurality of customers, wherein said first customer issued transponder device is possessed by said first customer, wherein said first customer data segment comprises first credit card data and second credit card data associated with a first customer, wherein said first credit card data is associated with a first credit card used by said first customer during a past purchase from said entity, wherein said second credit card data is associated with a preferred credit card belonging to said first customer, and wherein said first customer is located within a specified proximity of said first transceiver;
performing, by said computing apparatus, a first specified function for said first customer, said first specified function comprising approving said first credit card and said second credit card for purchases, said first specified function based on said first customer data segment and a location of said first transceiver;
receiving from a first object issued transponder device of said object issued transponder devices, by said computing apparatus through said first transceiver of said plurality of transceivers, a first object data segment from said plurality of object data segments, said first object data segment associated with and located on a first object of said plurality of objects, said first object data segment comprising pricing and description information for said first object, said first customer possessing said first object; and
automatically performing, by said computing apparatus based on said receiving said first customer data segment and said first object data segment, a second specified function related to said object, said second specified function based on said second object data segment, said second specified function comprising enabling a purchase of said object using said first credit card and/or said second credit card.

2. The method of claim 1, wherein said entity comprises a retail business, and wherein said plurality of transceivers are located in a specified grid arrangement with respect to point of sale locations within said retail business.

3. The method of claim 2, wherein said first customer data segment comprises data related to a financial institution used by said first customer, and wherein said first specified function comprises retrieving a financial transaction approval from said financial institution for said first customer to purchase products from said retail business.

4. The method of claim 2, wherein said first customer data segment comprises regulatory related data for said first customer, and wherein said first specified function comprises approving said first customer for purchasing restricted products from said retail business.

5. The method of claim 2, wherein said first customer data segment comprises customer data related to a plurality of purchasing means used by said first customer, and wherein said first specified function comprises predicting a first purchasing means of said plurality of purchasing means to be used by said first customer to purchase products from said retail business.

6. The method of claim 1, wherein said entity comprises a retail business, and wherein said plurality of transceivers are located in a specified grid arrangement with respect to point of sale locations within said retail business.

7. The method of claim 6, wherein said second specified function comprises monitoring a location of said first object.

8. The method of claim 6, wherein said second specified function comprises specifying a price for said first object, wherein said first customer data segment comprises data related to a financial institution used by said first customer, and wherein said first specified function comprises retrieving a financial transaction approval from said financial institution for said first customer to purchase said first object from said retail business for said price.

9. The method of claim 6, wherein said second specified function comprises specifying a regulatory status for said first object, wherein said first customer data segment comprises regulatory related data for said first customer, and wherein said first specified function comprises approving said first customer for purchasing said first object from said retail business.

10. The method of claim 1, wherein each said customer issued transponder device is a radio frequency identification (RFID) tag, and wherein each of said plurality of transceivers is an RFID scanner.

11. The method of claim 1, wherein said transaction system further comprises a plurality of retrieval transponder devices, each retrieval transponder device of said plurality of retrieval transponder devices comprising a retrieval issued transponder and a retrieval memory device, each said retrieval memory device comprising a retrieval data segment from a plurality of retrieval data segments, each said retrieval data segment associated with a different object from a plurality of objects for an entity, and wherein said method further comprises:
receiving from a first retrieval transponder device of said retrieval transponder devices, by said computing apparatus through said first transceiver of said plurality of transceivers, a first retrieval data segment from said plurality of retrieval data segments, said first retrieval data segment associated with first object of said plurality of objects; and
notifying, by said computing apparatus, a person of said entity to retrieve said object for said first customer, said notifying in response to said receiving said first retrieval data segment.

12. A transaction system comprising:
a computing apparatus;
a plurality of transceivers electrically connected to said computing apparatus;
a plurality of customer issued transponder devices, each customer issued transponder device of said plurality of customer issued transponder devices comprising a customer issued transponder and a customer issued memory device, each said customer issued memory device comprising a customer data segment from a plurality of customer data segments, each said customer data segment associated with a different customer from a plurality of customers for an entity, each said customer data segment comprising a preferred credit card payment means for an associated customer of said plurality of customers, wherein said computing apparatus is configured to receive from a first customer issued transponder device of said customer issued transponder devices, a first customer data segment from said plurality of customer data segments, said first customer data segment associated with a first customer of said plurality of customers, wherein said first customer issued transponder device is possessed by said first customer, wherein said first customer data segment comprises first credit card data and second credit card data associated with said first customer, wherein said first credit card data is associated with a first credit card used by said first customer during a past purchase from said entity, wherein said second credit card data is associated with a preferred credit card belonging to said first customer, and wherein said first customer is located within a specified proximity of a first transceiver of said plurality of transceivers, wherein said computing apparatus is further configured to perform a first specified function for said first customer, said first specified function comprising approving said first credit card and said second credit card for purchases, said first specified function based on said first customer data segment and a location of said first transceiver; and a plurality of object issued transponder devices, each object issued transponder device of said plurality of object issued transponder devices comprising an object issued transponder and an object issued memory device, each said object issued memory device comprising an object data segment from a plurality of object data segments, each said object data segment associated with and located on a different object from a plurality of objects for sale by said entity, each said object data segment comprising pricing information and a description for an associated object of said plurality of objects, wherein said computing apparatus is further configured to receive from a first object issued transponder device of said object issued transponder devices, a first object data segment from said plurality of object data segments, said first object data segment associated with and located on a first object of said plurality of objects, said first object data segment comprising pricing and description information for said first object, said first customer possessing said first object, wherein said computing apparatus is further configured to automatically perform a second specified function related to said object based on said first customer data segment and said first object data segment, wherein said second specified function is based on said second object data segment, and wherein said second specified function comprises enabling a purchase of said object using said first credit card and/or said second credit card.

13. The system of claim 12, wherein said entity comprises a retail business, and wherein said plurality of transceivers are located in a specified grid arrangement with respect to point of sale locations within said retail business.

14. The system of claim 13, wherein said first customer data segment comprises data related to a financial institution used by said first customer, and wherein said first specified function comprises retrieving a financial transaction approval from said financial institution for said first customer to purchase products from said retail business.

15. The system of claim 13, wherein said first customer data segment comprises regulatory related data for said first customer, and wherein said first specified function comprises approving said first customer for purchasing restricted products from said retail business.

16. The system of claim 13, wherein said first customer data segment comprises customer data related to a plurality of purchasing means used by said first customer, and wherein said first specified function comprises predicting a first purchasing means of said plurality of purchasing means to be used by said first customer to purchase products from said retail business.

17. The system of claim 12, wherein said entity comprises a retail business, and wherein said plurality of transceivers are located in a specified grid arrangement with respect to point of sale locations within said retail business.

18. The system of claim 17, wherein said second specified function comprises monitoring a location of said first object.

19. The system of claim 17, wherein said second specified function comprises specifying a price for said first object, wherein said first customer data segment comprises data related to a financial institution used by said first customer, and wherein said first specified function comprises retrieving a financial transaction approval from said financial institution for said first customer to purchase said first object from said retail business for said price.

20. The system of claim 17, wherein said second specified function comprises specifying a regulatory status for said first object, wherein said first customer data segment comprises regulatory related data for said first customer, and wherein said first specified function comprises approving said first customer for purchasing said first object from said retail business.

21. The system of claim 12, wherein each said customer issued transponder device is a radio frequency identification (RFID) tag, and wherein each of said plurality of transceivers is an RFID scanner.

22. The system of claim 12, wherein said transaction system further comprises a plurality of retrieval transponder devices, each retrieval transponder device of said plurality of retrieval transponder devices comprising a retrieval issued transponder and a retrieval memory device, each said retrieval memory device comprising a retrieval data segment from a plurality of retrieval data segments, each said retrieval data segment associated with a different object from a plurality of objects for an entity, and wherein said method further comprises:

receiving from a first retrieval transponder device of said retrieval transponder devices, by said computing apparatus through said first transceiver of said plurality of transceivers, a first retrieval data segment from said plurality of retrieval data segments, said first retrieval data segment associated with first object of said plurality of objects; and notifying, by said computing apparatus, a person of said entity to retrieve said object for said first customer, said notifying in response to said receiving said first retrieval data segment.

23. A computer readable storage medium comprising a computer program product, storing computer readable program code, said computer readable program code comprising instructions that when executed by a computer processor implement a transaction method within a transaction system, said method comprising:

receiving from a first customer issued transponder device of customer issued transponder devices, by a computing apparatus through a first transceiver of a plurality of transceivers, a first customer data segment from a plurality of customer data segments, said transaction system comprising a computing apparatus, said plurality of transceivers electrically connected to said computing apparatus, a plurality of object issued transponder devices, and a plurality of customer issued transponder devices, each customer issued transponder device of said plurality of customer issued transponder devices comprising a customer issued transponder and a customer issued memory device, each said customer issued memory device comprising a customer data segment from said plurality of customer data segments, each said customer data segment associated with a different customer from a plurality of customers for an entity, each said customer data segment comprising a preferred credit card payment means for an associated customer of said plurality of customers, each object issued transponder device of said plurality of object issued transponder devices comprising an object issued transponder and an object issued memory device, each said object issued memory device comprising an object data segment from a plurality of object data segments, each said object data segment associated with and located on a different object from a plurality of objects for sale by said entity, each said object data segment comprising pricing information and a description for an associated object of said plurality of objects, said first customer data segment associated with a first customer of said plurality of customers, wherein said first customer issued transponder device is possessed by said first customer, wherein said first customer data segment comprises first credit card data and second credit card data associated with a first customer, wherein said first credit card data is associated with a first credit card used by said first customer during a past purchase from said entity, wherein said second credit card data is associated with a preferred credit card belonging to said first customer, and wherein said first customer is located within a specified proximity of said first transceiver;

performing, by said computing apparatus, a first specified function for said first customer, said first specified function comprising approving said first credit card and said second credit card for purchases, said first specified function based on said first customer data segment and a location of said first transceiver;

receiving from a first object issued transponder device of said object issued transponder devices, by said computing apparatus through said first transceiver of said plurality of transceivers, a first object data segment from said plurality of object data segments, said first object data segment associated with and located on a first object of said plurality of objects, said first object data segment comprising pricing and description information for said first object, said first customer possessing said first object; and automatically performing, by said computing apparatus based on said receiving said first customer data segment and said first object data segment, a second specified function related to said object, said second specified function based on said second object data segment, said second specified function comprising enabling a purchase of said object using said first credit card and/or said second credit card.

24. The computer program product of claim 23, wherein said entity comprises a retail business, and wherein said plurality of transceivers are located in a specified grid arrangement with respect to point of sale locations within said retail business.

25. The computer program product of claim 24, wherein said first customer data segment comprises data related to a financial institution used by said first customer, and wherein said first specified function comprises retrieving a financial transaction approval from said financial institution for said first customer to purchase products from said retail business.

26. The computer program product of claim 24, wherein said first customer data segment comprises regulatory related data for said first customer, and wherein said first specified function comprises approving said first customer for purchasing restricted products from said retail business.

27. The computer program product of claim 24, wherein said first customer data segment comprises customer data related to a plurality of purchasing means used by said first customer, and wherein said first specified function comprises predicting a first purchasing means of said plurality of purchasing means to be used by said first customer to purchase products from said retail business.

28. The computer program product of claim 23, wherein said entity comprises a retail business, and wherein said plurality of transceivers are located in a specified grid arrangement with respect to point of sale locations within said retail business.

29. The computer program product of claim 28, wherein said second specified function comprises monitoring a location of said first object.

30. The computer program product of claim 28, wherein said second specified function comprises specifying a price for said first object, wherein said first customer data segment comprises data related to a financial institution used by said first customer, and wherein said first specified function comprises retrieving a financial transaction approval from said financial institution for said first customer to purchase said first object from said retail business for said price.

31. The computer program product of claim 28, wherein said second specified function comprises specifying a regulatory status for said first object, wherein said first customer data segment comprises regulatory related data for said first customer, and wherein said first specified function comprises approving said first customer for purchasing said first object from said retail business.

32. The computer program product of claim 23, wherein each said customer issued transponder device is a radio frequency identification (RFID) tag, and wherein each of said plurality of transceivers is an RFID scanner.

33. The computer program product of claim 23, wherein said transaction system further comprises a plurality of retrieval transponder devices, each retrieval transponder device of said plurality of retrieval transponder devices comprising a retrieval issued transponder and a retrieval memory device, each said retrieval memory device comprising a retrieval data segment from a plurality of retrieval data segments, each said retrieval data segment associated with a different object from a plurality of objects for an entity, and wherein said method further comprises:

receiving from a first retrieval transponder device of said retrieval transponder devices, by said computing apparatus through said first transceiver of said plurality of transceivers, a first retrieval data segment from said plurality of retrieval data segments, said first retrieval data segment associated with first object of said plurality of objects; and notifying, by said computing apparatus, a person of said entity to retrieve said object for said first customer, said notifying in response to said receiving said first retrieval data segment.

34. A process for integrating computing infrastructure in a transaction system, said process comprising providing at least one support service for at least one of creating, integrating, hosting, maintaining, and deploying computer-readable code in a computing system, wherein the code in combination with the computing system is capable of performing:

into a transaction system receiving from a first customer issued transponder device of customer issued transponder devices, by a computing apparatus through a first transceiver of a plurality of transceivers, a first customer data segment from a plurality of customer data segments, said transaction system comprising a computing apparatus, said plurality of transceivers electrically connected to said computing apparatus, a plurality of object issued transponder devices, and plurality of customer issued transponder devices, each customer issued transponder device of said plurality of customer issued transponder devices comprising a customer issued transponder and a customer issued memory device, each said customer issued memory device comprising a customer data segment from said plurality of customer data segments, each said customer data segment associated with a different customer from a plurality of customers for an entity, each said customer data segment comprising a preferred credit card payment means for an associated customer of said plurality of customers, each object issued transponder device of said plurality of object issued transponder devices comprising an object issued transponder and an object issued memory device, each said object issued memory device comprising an object data segment from a plurality of object data segments, each said object data segment associated with and located on a different object from a plurality of objects for sale by said entity, each said object data segment comprising pricing information and a description for an associated object of said plurality of objects, said first customer data segment associated with a first customer of said plurality of customers, wherein said first customer issued transponder device is possessed by said first customer, wherein said first customer data segment comprises first credit card data and second credit card data associated with a first customer, wherein said first credit card data is associated with a first credit card used by said first customer during a past purchase from said entity, wherein said second credit card data is associated with a preferred credit card belonging to said first customer, and wherein said first customer is located within a specified proximity of said first transceiver;

performing, by said computing apparatus, a first specified function for said first customer, said first specified function comprising approving said first credit card and said second credit card for purchases, said first specified function based on said first customer data segment and a location of said first transceiver;

receiving from a first object issued transponder device of said object issued transponder devices, by said computing apparatus through said first transceiver of said plurality of transceivers, a first object data segment from said plurality of object data segments, said first object data segment associated with and located on a first object of said plurality of objects, said first object data segment comprising pricing and description information for said first object, said first customer possessing said first object; and automatically performing, by said computing apparatus based on said receiving said first customer data segment and said first object data segment, a second specified function related to said object, said second specified function based on said second object data segment, said second specified function comprising enabling a purchase of said object using said first credit card and/or said second credit card.

35. The process of claim 34, wherein said entity comprises a retail business, and wherein said plurality of transceivers are located in a specified grid arrangement with respect to point of sale locations within said retail business.

36. The process of claim 35, wherein said first customer data segment comprises data related to a financial institution used by said first customer, and wherein said first specified function comprises retrieving a financial transaction approval from said financial institution for said first customer to purchase products from said retail business.

37. The process of claim 35, wherein said first customer data segment comprises regulatory related data for said first customer, and wherein said first specified function comprises approving said first customer for purchasing restricted products from said retail business.

38. The process of claim 35, wherein said first customer data segment comprises customer data related to a plurality of purchasing means used by said first customer, and wherein said first specified function comprises predicting a first purchasing means of said plurality of purchasing means to be used by said first customer to purchase products from said retail business.

39. The process of claim 34, wherein said entity comprises a retail business, and wherein said plurality of transceivers are located in a specified grid arrangement with respect to point of sale locations within said retail business.

40. The process of claim 39, wherein said second specified function comprises monitoring a location of said first object.

41. The process of claim 39, wherein said second specified function comprises specifying a price for said first object, wherein said first customer data segment comprises data related to a financial institution used by said first customer, and wherein said first specified function comprises retrieving a financial transaction approval from said financial institution for said first customer to purchase said first object from said retail business for said price.

42. The process of claim 39, wherein said second specified function comprises specifying a regulatory status for said first object, wherein said first customer data segment comprises regulatory related data for said first customer, and wherein said first specified function comprises approving said first customer for purchasing said first object from said retail business.

43. The process of claim 34, wherein each said customer issued transponder device is a radio frequency identification (RFID) tag, and wherein each of said plurality of transceivers is an RFID scanner.

44. The process of claim 34, wherein said transaction system further comprises a plurality of retrieval transponder devices, each retrieval transponder device of said plurality of retrieval transponder devices comprising a retrieval issued transponder and a retrieval memory device, each said retrieval memory device comprising a retrieval data segment from a plurality of retrieval data segments, each said retrieval data segment associated with a different object from a plurality of objects for an entity, and wherein said method further comprises:

receiving from a first retrieval transponder device of said retrieval transponder devices, by said computing apparatus through said first transceiver of said plurality of transceivers, a first retrieval data segment from said plurality of retrieval data segments, said first retrieval data segment associated with first object of said plurality of objects; and notifying, by said computing apparatus, a person of said entity to retrieve said object for said first customer, said notifying in response to said receiving said first retrieval data segment.

45. The method of claim 1, further comprising:
receiving from a second customer issued transponder device of said customer issued transponder devices, by said computing apparatus through a second transceiver of said plurality of transceivers, a second customer data segment from said plurality of customer data segments, said second customer data segment associated with said first customer, wherein said second customer issued transponder device is possessed by said first customer, wherein said first customer data segment comprises regulatory data indicating an approval for said first customer to purchase a regulatory controlled item, wherein said automatically performing is further based on said receiving said customer data segment, and wherein said object comprises said regulatory controlled item.

46. The method of claim 45, wherein regulatory controlled item comprises a prescription drug.

47. The method of claim 45, wherein said regulatory data comprises a gun permit for said first customer, and wherein regulatory controlled item comprises a gun.

\* \* \* \* \*